United States Patent
Lau et al.

(10) Patent No.: US 7,624,250 B2
(45) Date of Patent: Nov. 24, 2009

(54) HETEROGENEOUS MULTI-CORE PROCESSOR HAVING DEDICATED CONNECTIONS BETWEEN PROCESSOR CORES

(75) Inventors: Sinn Wee Lau, Penang (MY); Choon Yee Loh, Penang (MY); Kar Meng Chan, Penang (MY)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 11/294,809

(22) Filed: Dec. 5, 2005

(65) Prior Publication Data

US 2007/0130445 A1    Jun. 7, 2007

(51) Int. Cl.
 *G06F 15/16* (2006.01)
(52) U.S. Cl. .......................................... 712/11
(58) Field of Classification Search ............ 712/36, 712/11
See application file for complete search history.

(56) References Cited

U.S. PATENT DOCUMENTS

| | | | |
|---|---|---|---|
| 6,769,033 B1 * | 7/2004 | Bass et al. ............... | 709/246 |
| 6,809,734 B2 | 10/2004 | Suzuoki et al. | |
| 6,865,157 B1 * | 3/2005 | Scott et al. ............... | 370/242 |
| 6,868,476 B2 | 3/2005 | Rosenbluth et al. | |
| 6,876,561 B2 | 4/2005 | Wolrich et al. | |
| 6,980,427 B2 * | 12/2005 | Garnett et al. ............. | 361/685 |
| 7,058,828 B2 * | 6/2006 | Barr et al. .................. | 713/320 |
| 7,395,471 B2 * | 7/2008 | Whetsel ..................... | 714/726 |
| 2003/0145173 A1 | 7/2003 | Wilkinson, III et al. | |
| 2005/0149691 A1 | 7/2005 | Lakshmanamurthy et al. | |

OTHER PUBLICATIONS

Vermeulen, B., etal., IEEE 1149.1-compliant Access Architecture for Multiple Core Debug on Digital System Chips, 2002, IEEE, pp. 55-63.*
Katopis. G.A., etal..,T-Rex, A Blade Packaging Architecture for Mainframe Servers, Feb. 2005,, IEEE transactions on advanced packaging, pp. 24-31.*
Kapil, Sanjiv, etal. A Chip Multithreaded Processor for Network Facing Workloads, 2004, IEEE pp. 20-30.*
Intel IXP1200 Network Processor Family, Microcode Programmer's Reference Manual Mar. 2002, Part No. 278304-011, 314 pages.
C-5 Network Processor Architecture Guide, C-5 NP Do Release, Motorola, May 31, 2001, pp. 1-212 & 365-377.
IA-32 Intel Architecture Optimization Reference Manual, Order No. 248966-011, 1999-2004.
Kumar et al, Single-ISA Heterogeneous Multi-Core Architectures: The Potential for Processor Power Reduction, Proceedings of the 36th Int'l symposium on Micorarchitecture IEEE 2003.
Intel XScale Core Developer's Manual, Jan. 2004, 220 pages.

* cited by examiner

*Primary Examiner*—Eric Coleman (57) ABSTRACT

The disclosure describes a processor having processor cores integrated on the same die that have different functional operationality. The processor also includes a chain of multiple dedicated unidirectional connections spanning processor cores. The multiple dedicated unidirectional connections terminate in registers within the respective processor cores. The registers may form a queue such as a ring queue.

22 Claims, 8 Drawing Sheets

HETEROGENEOUS MULTI-CORE PROCESSOR HAVING DEDICATED CONNECTIONS BETWEEN PROCESSOR CORES

BACKGROUND

In the past, processors such as CPUs (central processing units) featured a single execution unit to process instructions of a program. Recently, multi-core architectures have emerged that amass multiple processor cores on a single integrated silicon die. Each of the processor cores can simultaneously execute program instructions. This parallel operation of the processor cores can improve performance of a variety of applications. For example, some network devices (e.g., switches and routers) incorporate programmable multi-core processors known as network processors. The multiple cores of the network processors enable the network devices to keep apace the large volume network traffic flowing through the device. For instance, while one core determines how to forward one network packet further toward its destination, a different core can determine how to forward another. The multiple cores can enable the network processors to achieve speeds rivaling "hard-wired" ASICs (Application Specific Integrated Circuits) while remaining programmable.

SUMMARY

In general, in one aspect, a processor includes multiple cores integrated on a single semiconductor die. The multiple cores include a first set of processor cores integrated on the single semiconductor die having the same functional operationality and a second set of at least one processor core integrated on the single semiconductor die having a different functional operationality than a processor core of the first set of processor cores. The processor also includes a chain of multiple dedicated unidirectional connections spanning the first and second set of processor cores where at least one of the connections is between a one of the first set of processor cores and a one of the second set of processor cores. The multiple dedicated unidirectional connections terminate in registers within the respective processor cores. The registers in one of the second set of processor cores includes multiple registers that a one of the first set of processor cores accesses as a circular ring queue. The second set of processor cores includes at least one ring register. The ring register is updated when an operation is performed on the circular ring.

Embodiments may include one or more of the following. The multiple dedicated unidirectional connections may include a connection from a one of the second set of processor cores to a one of the first set of processor cores. The multiple dedicated unidirectional connections may include a connection from a one of the first set of processor cores to the one of a second set of processor cores. Each processor core in the first set of processor cores has the same instruction set and the second set of at least one processor cores has a different instruction set than processor cores in the first set of processor cores. Each processor core in the first set of processor cores may have the same processor core component architecture and the second set of at least one processor cores may include a set of at least one processor core having a different processor core component architecture than processor cores in the first set of processor cores. The multiple processors cores may have a single dedicated unidirectional connection to a different one of the multiple processor cores. The multiple cores may include a processor core having multiple dedicated unidirectional connections to different ones of the multiple processor cores. The dedicated unidirectional connections may form an acyclic graph. A one of the second set of processor cores may include a processor core having an instruction set that includes at least one instruction that uses the register as an instruction operand where the at least one instruction is to be included in a program executed by the processor core. The first set of processor cores may include processor cores having multiple hardware contexts for multiple, respective, threads of execution. Data transfers between the cores may be asynchronous with respect to other data transfers between the cores. The dedicated unidirectional connections may form a cyclic graph. At least one core in the first set of processor cores and the second set of processor cores may include a core having dedicated unidirectional connections terminating in registers of more than two other of the cores. At least some of the cores in the first set of processor cores and the second set of at least one processor core may not be coplanar and at least some of the dedicated unidirectional connections connect ones of the processor cores that are not coplanar.

In general, in another aspect, a network device includes multiple blades interconnected by a switch fabric. At least one of the multiple blades includes a blade having a processor having multiple cores integrated on a single semiconductor die. The multiple cores include a first set of processor cores integrated on the single semiconductor die having the same functional operationality where the first set of processor cores each have multiple hardware contexts for multiple, respective, threads of execution. The second set of at least one processor core integrated on the single semiconductor die has a different functional operationality than a processor core of the first set of processor cores. The processor further includes a chain of multiple dedicated unidirectional connections spanning the first and second set of processor cores where at least one of the multiple dedicated unidirectional connections is between a one of the first set of processor cores and a one of the second set of processor cores. The multiple dedicated unidirectional connections terminate in registers within the respective processor cores. The registers in a one of the second set of processor cores includes multiple registers that a one of the first set of processor cores accesses as a circular ring queue. The second set of processor cores includes at least one ring register which is updated when an operation is performed on the circular ring.

Embodiments may include one or more of the following. Each processor core in the first set of processor cores comprises a processor core having the same instruction set and where the second set of at least one processor cores include a set of at least one processor cores having a different instruction set than processor cores in the first set of processor cores. The dedicated unidirectional connections may form an acyclic graph. A one of the second set of processor cores includes a processor core having an instruction set that includes at least one instruction that uses the at least one register as an instruction operand.

In general, in one aspect, a method includes transferring a first set of data from a one of a first set of processor cores of a processor to a one of a second set of processor cores via a one of multiple dedicated unidirectional connections. The processor includes multiple cores integrated on a single semiconductor die. The first set of processor cores integrated on the single semiconductor die have the same functional operationality. The second set of at least one processor core integrated on the single semiconductor die have a different functional operationality than a processor core of the first set of processor cores. The processor includes a chain of multiple dedicated unidirectional connections spanning the first and second set of processor cores where at least one of the multiple dedicated unidirectional connections is between a one of the first set of processor cores and a one of the second set of processor cores. The multiple dedicated unidirectional connections terminate in registers within the respective processor cores. The registers terminating a unidirectional connection within a respective processor core form a queue.

Embodiments may include one or more of the following. The method may include transferring a second set of data from a one of the first set of processor cores to a one of the second set of processor cores via a one of the multiple dedicated unidirectional connections asynchronously with respect to the transferring the first set of data where a time overlap occurs between the transferring the first set of data and the transferring the second set of data and one of the first set of processor cores transferring the second set of data is different than the one of the first set processor cores transferring the first set of data. The respective processors core may generate a queue full signal for the queue of the respective processor core. The queue may comprise a circular ring queue.

DETAILED DESCRIPTION

Figure 1:
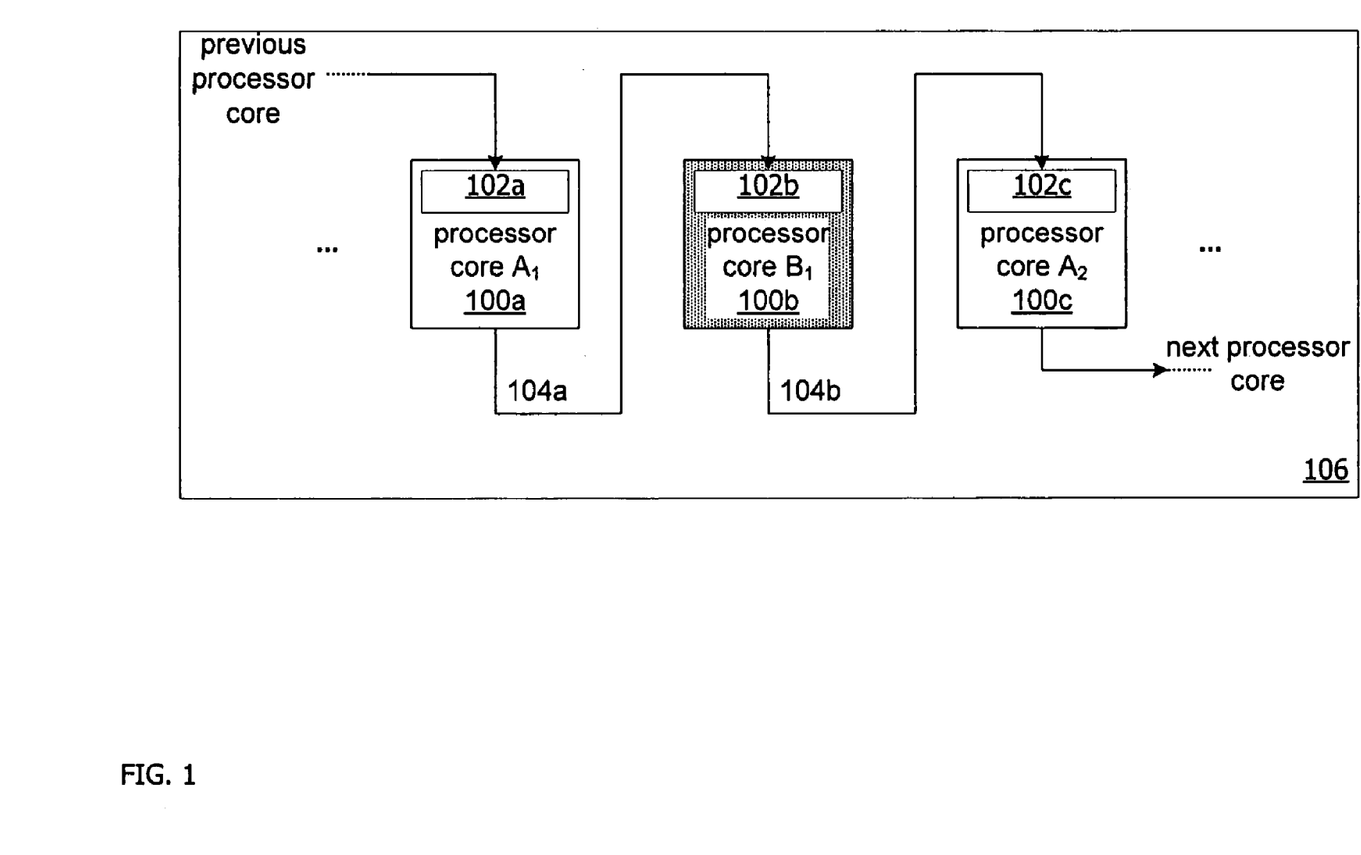
FIG. 1 depicts a heterogeneous multi-core processor having dedicated connections between cores.

FIG. 1 depicts a multi-core processor 106 architecture that enables processor cores 100a-100c integrated on a single semiconductor die to communicate. For example, as shown, cores 100a, 100b, and 100c are connected by dedicated unidirectional connections 104a, 104b between the cores 100a-100c. For instance, core 100a can send data to core 100b via connection 104a. In operation, such a connection 104a may be used, for example, by core 100a to send network packet related data (e.g., a pointer to a packet payload or flow data) to core 100b. Unlike a shared bus, a dedicated connection permits inter-core communication without contention, negotiating for bus control, and so forth.

As shown, each connection 104a, 104b terminates in one or more processor core registers 102a, 102b, 102c that stores the transmitted data. Thus, a given processor core (e.g., 100b) can access its registers (e.g., 102b) to read data written by the preceding core (e.g., 100a). Potentially, a given processor core (e.g., 100b) can also write data into its own registers (e.g., 102b).

The processor cores 102a-102c may feature logic that uses the registers 102a-102c to implement a queue. For example, the logic may generate a queue FULL signal when a set of processor core registers 102a-102c exceeds a threshold of consumed queue entries. Similarly, the logic may also generate an EMPTY signal. This logic may also manage queue head and tail indexes to implement a queue ring that perpetually wraps around the registers as entries are produced and consumed. The signals produced by the logic may be used both by the receiving processor core 100a-100c and by the upstream processor core writing to the registers 102a-102c to determine the state of a queue.

Figure 4:
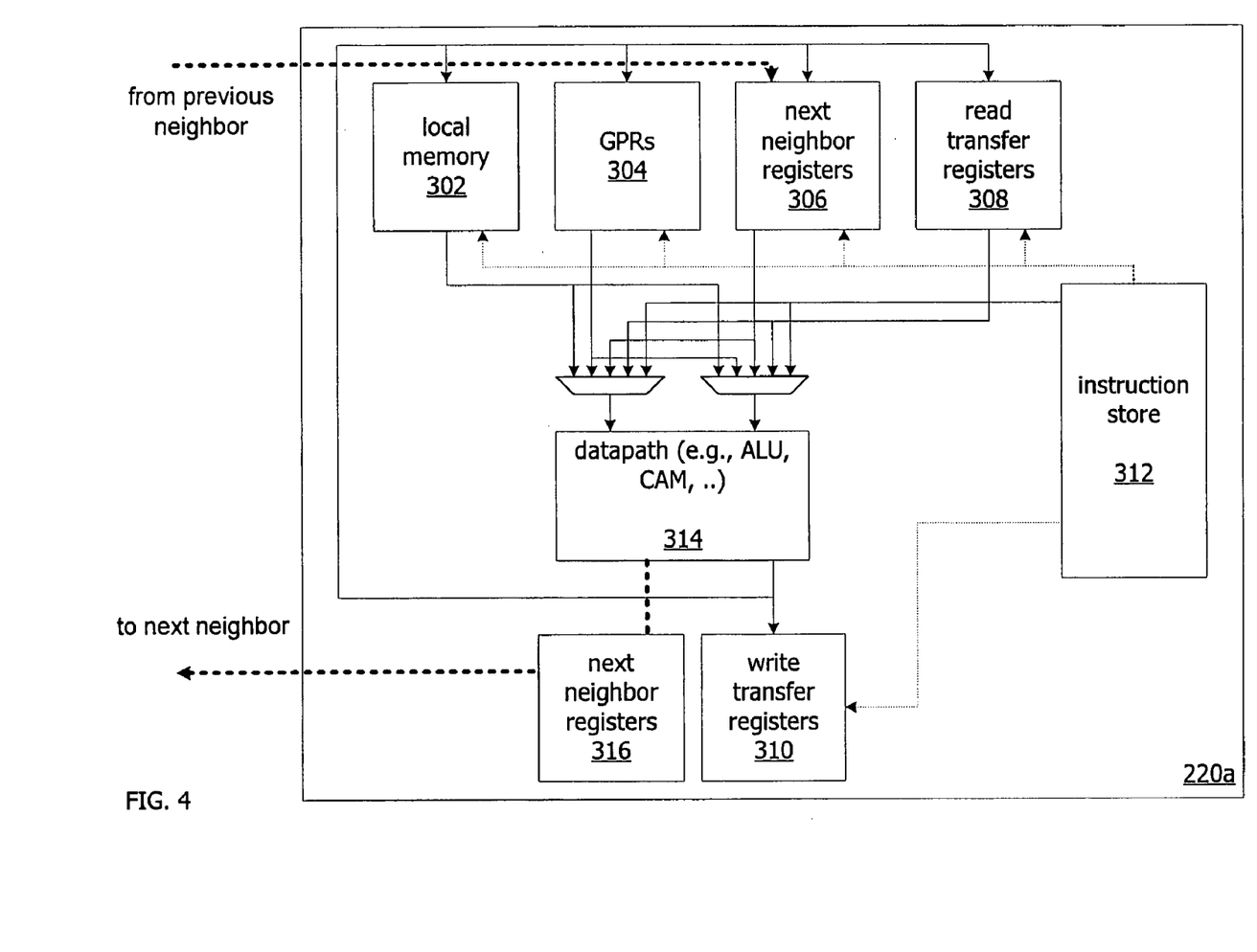
FIGS. 4 and 5 depict different processor cores of a network processor.
Figure 5:
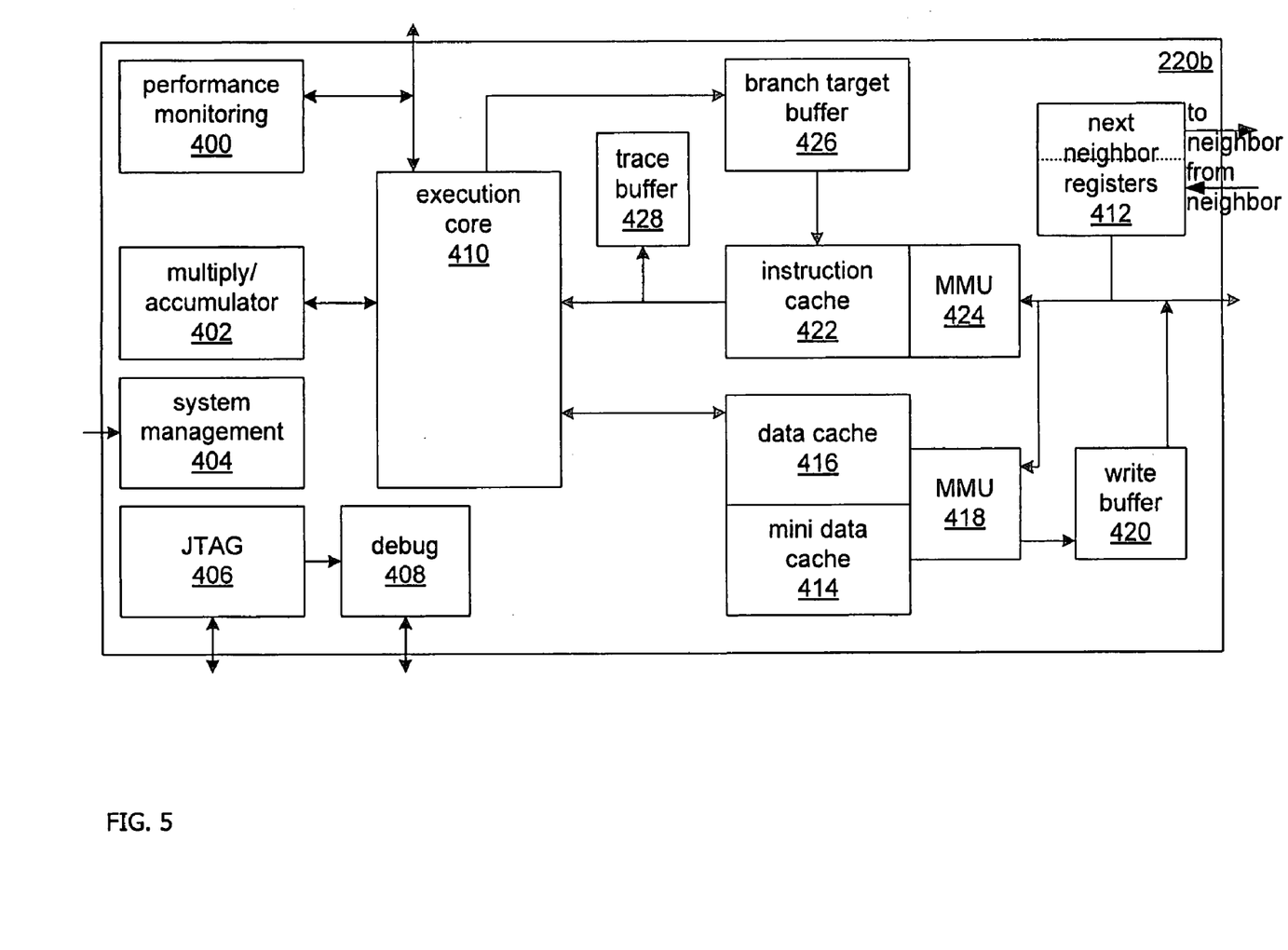

The processor cores 100a-100c depicted in FIG. 1 are heterogeneous. That is, the processor cores 100a-100c may provide different functional operationality. For example, FIG. 1 features a first set of cores (cores A1 100a and A2 100c) having the same functional operationality and a core B1 (shaded) having different functional operationality. For instance, the "A" cores and "B" core(s) may differ in the instruction set offered by the cores. The heterogeneous cores may also feature different internal core architectures. For instance, FIGS. 4 and 5 depict the different component architectures of a microengine processor core and an XScale(r) processor core. While FIG. 1 depicted a single core 100b having a different functional operationality than the other cores 100a, 100c, other implementations may have more than one such core.

Data transmissions over connections 104a, 104b depicted in FIG. 1 are asynchronous with respect to one another. That is, while the connections may be commonly clocked, a transfer of data across any one of the connections is independent with respect to data transfer over the other connections. For example, core A1 100a can transfer data to core B1 100b irrespective of whether core B1 is transferring data to core A2 100c.

Though not shown, the cores 102a-102c may feature additional circuitry to signal transfer of a data across the connections. For example, core 102a may send a signal to core 102b after writing data into register(s) 104b.

Figure 2A:
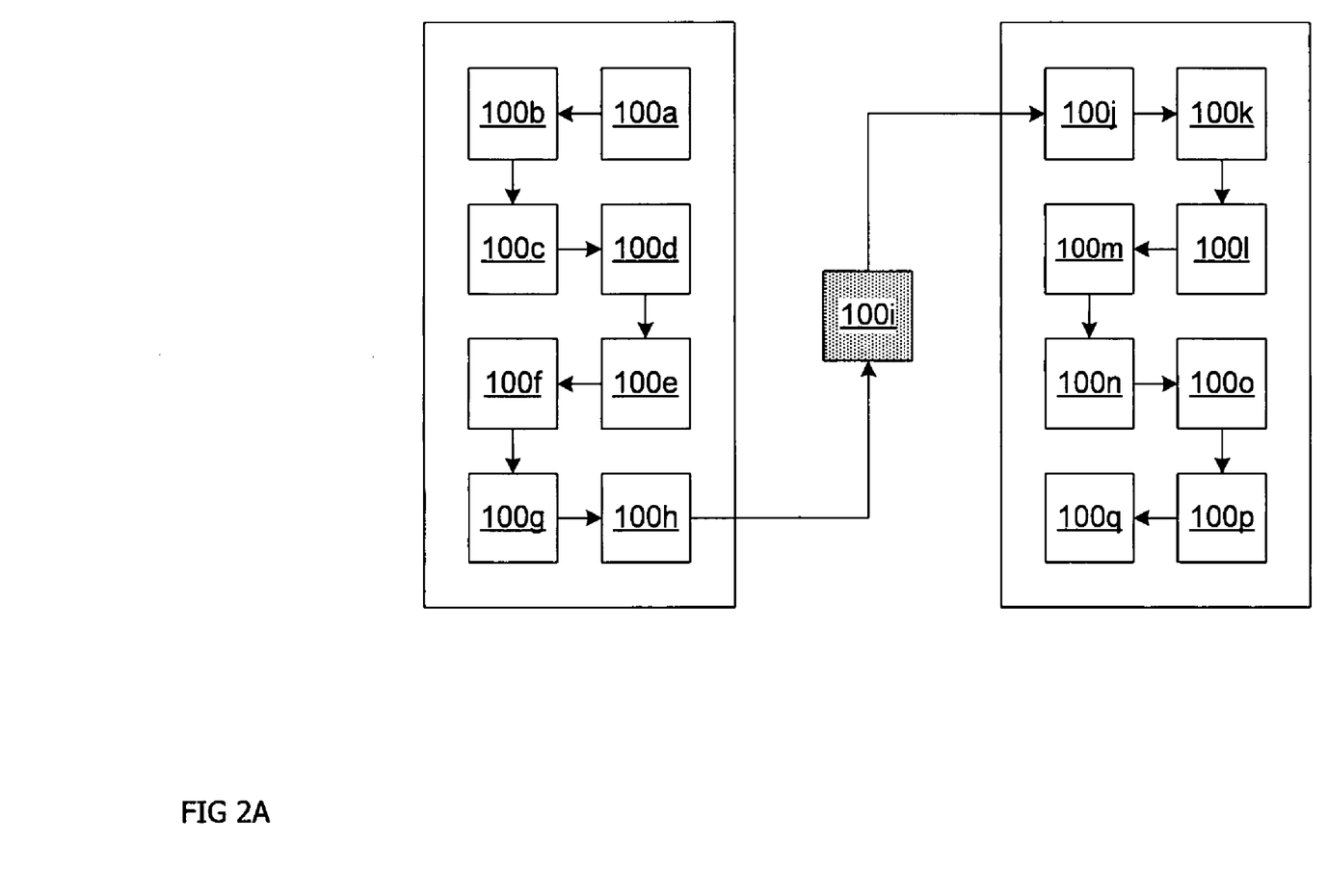
FIGS. 2A-2C depict different configurations of dedicated connections between cores.
Figure 2B:
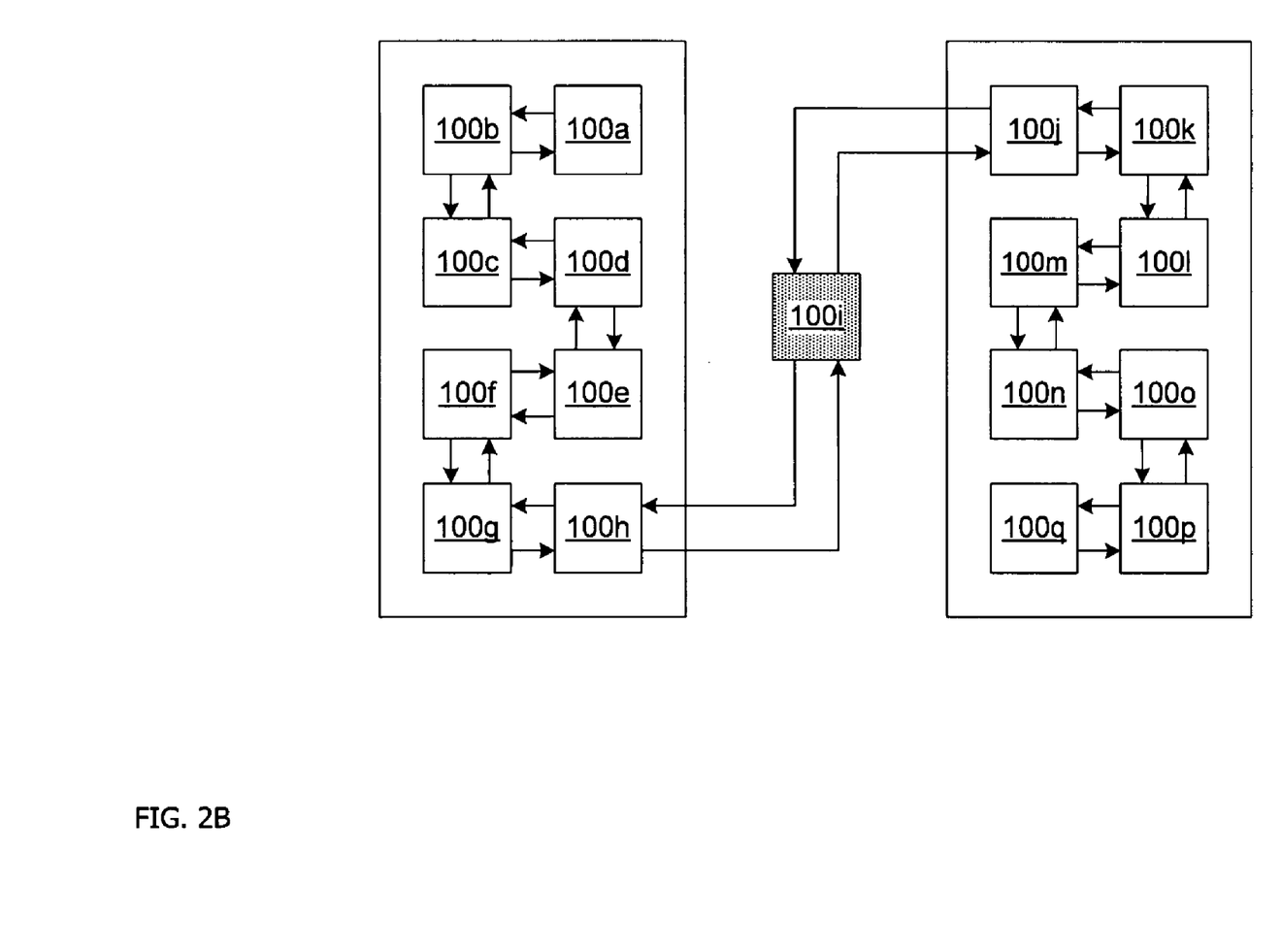
Figure 2C:
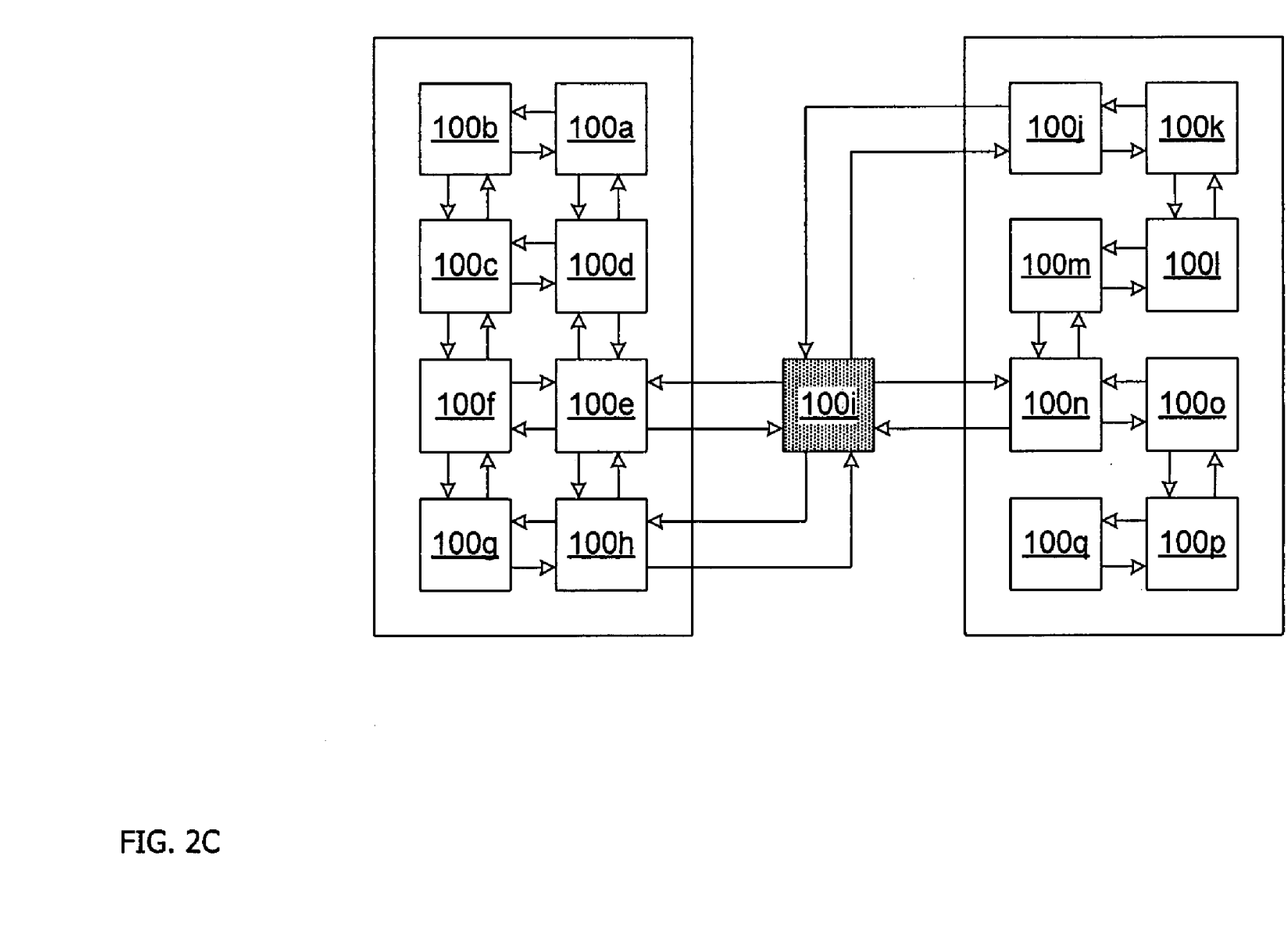

As shown in FIG. 1, the connections between the heterogeneous cores 100a-100c may form a unidirectional chain of connected cores. As shown in FIGS. 2A-2C, the connections between cores may form different core networks. For example, the processor shown in FIG. 2A features two clusters of homogeneous processor cores 100a-100h, 100j-100p linked by connections to/from processor core 100i having a different functional operationality. In this example, like the architecture shown in FIG. 1, the unidirectional connections form an acyclic graph.

Instead of being the source of a single dedicated unidirectional connection, a given core may feature multiple such connections. For example, as shown in FIG. 2B, core 100i has unidirectional connections to cores 100j and 100h. A core may also be the destination of multiple unidirectional connections. For example, core 100i receives data from cores 100j and 100h. In such embodiments, a given processor core 100i may feature different sets of registers 104n terminating each in-bound unidirectional connection. In other implementations, the interconnections between processor cores 100 may not be limited to a linear chain. For example, the processor shown in FIG. 2C may feature processor cores interconnected by a number of different unidirectional connections. Additionally, in other implementations (not shown), the processor cores 100 may not be co-planar. In such implementations, the different unidirectional connections may be between cores on different planes (e.g., a unidirectional connection extending in the x, y, or z dimension).

Figure 3:
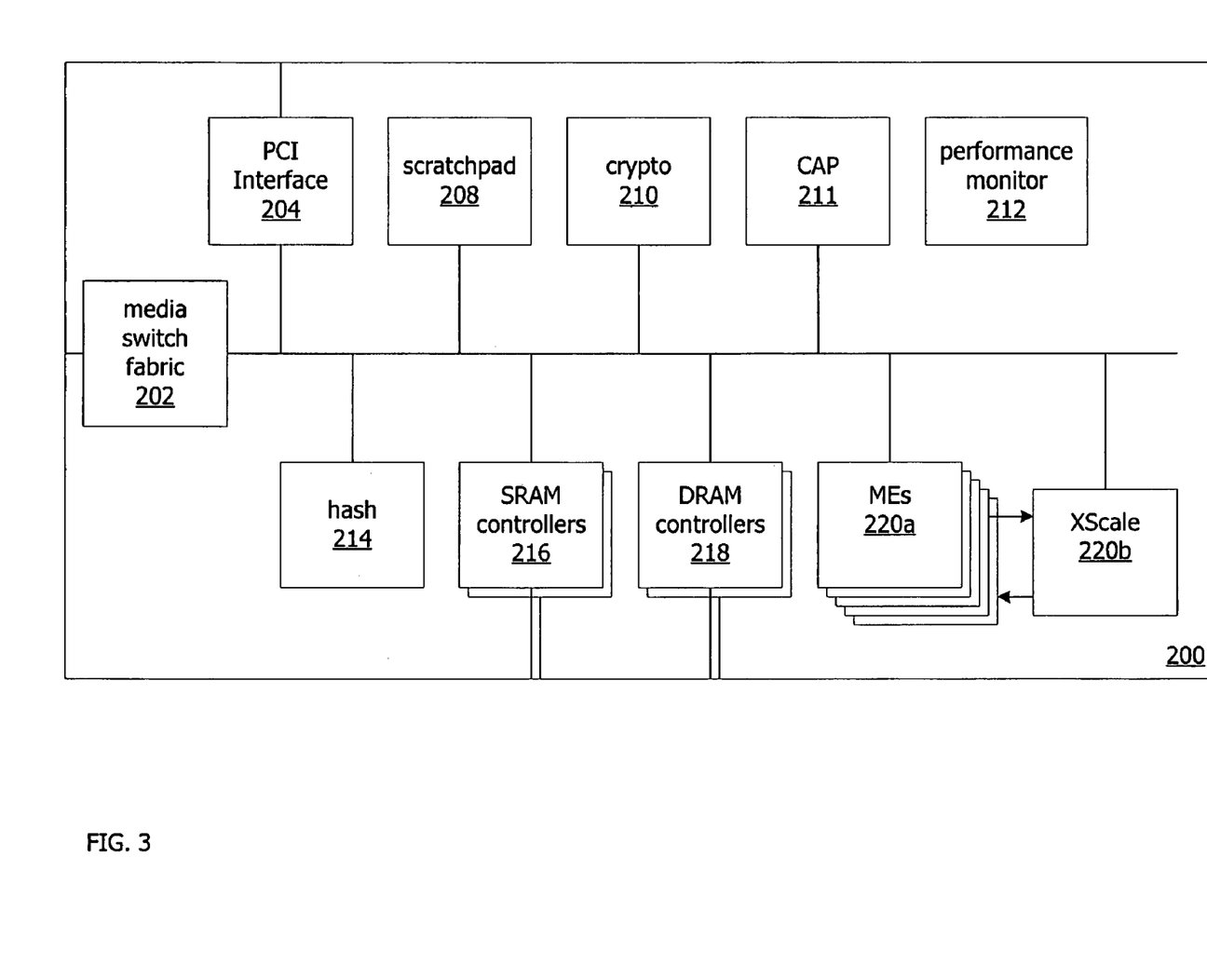
FIG. 3 depicts a network processor.

The inter-core connections described above can be implemented in a variety of processors. For example, the techniques may be used within a network processor. For instance, FIG. 3 depicts an example of network processor 200 that can be programmed to process packets received over a network. The network processor 200 shown is an Intel® Internet eXchange network Processor (IXP). Other processors feature different designs.

The network processor 200 shown features a collection of programmable processor cores 220a known as microengines on a single integrated semiconductor die. Each processor core 220*a* may be a Reduced Instruction Set Computer (RISC) processor tailored for packet processing. For example, the processor cores 220*a* may not provide floating point or integer division instructions commonly provided by the instruction sets of general purpose processors. Individual processor cores 220*a* may provide multiple threads of execution. For example, a processor core 220*a* may store multiple program counters and other context data for different threads.

The network processor 200 also includes an additional general purpose processor core 220*b* (e.g., a StrongARM® XScale® or Intel Architecture core) that is often programmed to perform "control plane" or "slow path" tasks involved in network operations while the cores 220*a* are often programmed to perform "data plane" or "fast path" tasks. The network processor 200, thus, includes a heterogeneous set of processor cores (e.g., the microengines 220*a* and the XScale 220*b*).

As shown, other components of the network processor 200 include an interface 202 that can carry packets between the processor 200 and other network components. For example, the processor 200 can feature a switch fabric interface 202 (e.g., a Common Switch Interface (CSIX)) that enables the processor 200 to transmit a packet to other processor(s) or circuitry connected to a switch fabric. The processor 200 can also feature an interface 202 (e.g., a System Packet Interface (SPI) interface) that enables the processor 200 to communicate with physical layer (PHY) and/or link layer devices (e.g., MAC or framer devices). The processor 200 may also include an interface 204 (e.g., a Peripheral Component Interconnect (PCI) bus interface) for communicating, for example, with a host or other network processors.

As shown, the processor 200 includes other components shared by the processor cores 220*a*, 220*b* such as a cryptography core 210, internal scratchpad memory 208, and memory controllers 216, 218 that provide access to external memory shared by the cores 220*a*. The processor cores 220 may communicate with other processor cores 220 via the shared resources (e.g., by writing data to external memory or the scratchpad 208). The cores 220 may also communicate via a CAP (CSR (Control Status Register) Access Proxy) 211 unit that routes data between cores 220.

The cores 220 may also communicate using the unidirectional connections described above. As shown, the connections between the processor cores includes a connection between one of the microengine cores 220*a* and XScale core 220*b* and between the XScale core 220*b* and one of the microengine cores 220*a*. In IXP parlance, the XScale core 220*b* is the "next neighbor" of the upstream microengine core 220*a* sending the XScale core 220*b* data, though the term neighbor need not imply a geographic proximity on the die. Likewise, the downstream core 220*a* receiving data from the XScale core 220*b* is the XScale core's 220*b* next neighbor.

The direct connection from a microengine 220*a* to the XScale 220*b* can dramatically improve performance of the network processor. That is, instead of using cycles of a microengine core 220*a* to write data to the scratchpad 208 for the XScale core 220*b* to read, data (e.g., packet or packet meta-data data or pointers) can be directly delivered to the XScale 220*b* in a single cycle. In addition to speeding data transfer to the XScale 220*b*, the connection frees the scratchpad 208 for other purposes.

FIG. 4 depicts a sample microengine processor core 220*a* component architecture in greater detail. As shown the core 220*a* includes an instruction store 312 to store programming instructions processed by a datapath 314. The datapath 314 may include an ALU (Arithmetic Logic Unit), Content Addressable Memory (CAM), shifter, and/or other hardware to perform other operations. The core 220*a* includes a variety of memory resources such as local memory 302 and general purpose registers 304. The core 220*a* shown also includes read and write transfer registers 308, 310 that store information being sent to/received from components external to the core; next neighbor registers 306 that store information being directly received from an upstream "neighbor" core 220*a* over the unidirectional connection; and next neighbor registers 316 that buffer information being transferred to a downstream neighbor core 220*a*.

The next neighbor registers 306, 316 may be used as register operands in the microengine instructions. The microengine may feature the instruction set, for example, listed in Appendix A of "Using IXP2400/2800 Development Tools" by Donald Hooper, copyright 2004 Intel Press.

FIG. 5 depicts the component architecture of an XScale 220*b* processor core. As shown, the XScale processor core components features an execution core 410 (e.g., an ARM core) and next neighbor registers 412 that terminate a unidirectional connection from a source microengine. The XScale ARM instruction set (described, for example, in "ARM: Architecture Reference Manual", by David Seal, 2nd edition, copyright 2000, Addison-Wesley) can include the registers 412 as register operands in the XScale data processing instructions. The next neighbor registers 412 may be used to both buffer data being written over a unidirectional connection to the XScale's next neighbor and to buffer data received from an upstream next neighbor. Additionally, the XScale may include ring registers to store ring queue indexes (e.g., head and tail) and flags identifying the state of a queue implemented on the registers 412.

As shown, the XScale processor core 220*b* executes instructions provided by instruction cache 422. The instruction cache 422 is loaded in response to request from the ARM core 410 and by instruction memory management unit 424 in the case of prefetch requests. A branch target buffer 426 includes a history of particular instructions branches taken during execution.

The XScale 220*b* can access memory through caches 416, 414. Fetching from external memory is handled by the memory management unit 418. Data being written to external memory can be buffered in the write buffer 420 to speed write operations. The XScale 220*b* shown also features a co-processor 402 that handles multiply and accumulate operations commonly used in audio media applications. The XScale 220*b* also includes other components such as a performance monitor 430 having programmable event and clock counters, system management unit 404 that permits clock and power management, and a JTAG (Joint Test Access Group) port 406 that can provide access to a debug unit 408 that permits debugging operations (e.g., stop execution) to be performed by an external host system.

While FIGS. 4 and 5 depicted specific processor core architectures, a wide variety of other architectures may be used. For example, an IA (Intel Architecture) core may be used in lieu of an XScale core. Other manufactures provide cores with different architectures, featuring different components, and providing different functional operationality.

Figure 6:
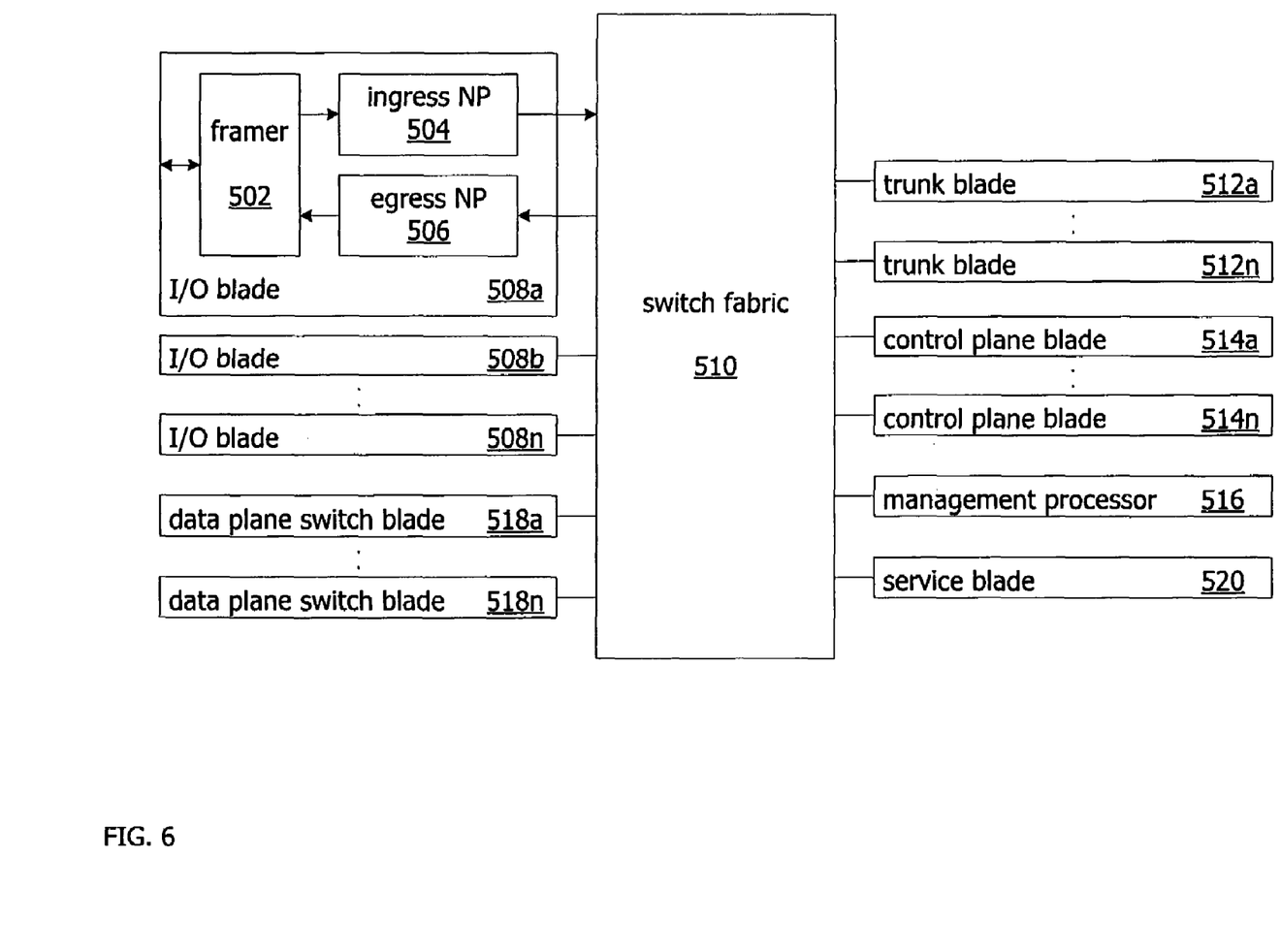
FIG. 6 depicts a network device.

FIG. 6 depicts a network device that includes a heterogeneous multi-core processor described above. As shown, the device features a collection of blades 508-520 holding integrated circuitry interconnected by a switch fabric 510 (e.g., a crossbar or shared memory switch fabric). As shown the device features a variety of blades performing different operations such as I/O blades 508*a*-508*n*, data plane switch blades 518*a*-518*b*, trunk blades 512*a*-512*b*, control plane blades 514a-514n, and service blades. The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual blades (e.g., 508a) may include one or more physical layer (PHY) devices (not shown) (e.g., optic, wire, and wireless PHYs) that handle communication over network connections. The PHYs translate between the physical signals carried by different network mediums and the bits (e.g., "0"-s and "1"-s) used by digital systems. The line cards 508-520 may also include framer devices (e.g., Ethernet, Synchronous Optic Network (SONET), High-Level Data Link (HDLC) framers or other "layer 2" devices) 502 that can perform operations on frames such as error detection and/or correction. The blades 508a shown may also include one or more network processors 504, 506 having the unidirectional connections described above that perform packet processing operations for packets received via the PHY(s) 502 and direct the packets, via the switch fabric 510, to a blade providing an egress interface to forward the packet. Potentially, the network processor(s) 506 may perform "layer 2" duties instead of the framer devices 502.

While FIGS. 3-6 described specific examples of a network processor and a device incorporating network processors, the techniques may be implemented in a variety of processor architectures. Additionally, the techniques may be used in a wide variety of network devices (e.g., a router, switch, bridge, hub, traffic generator, and so forth).

The term logic as used herein includes hardwired circuitry, digital circuitry, analog circuitry, programmable circuitry, and so forth. The programmable circuitry may operate on computer programs.

Other embodiments are within the scope of the following claims.

What is claimed is:

1. A processor, comprising:
   multiple cores integrated on a single semiconductor die, the multiple cores including:
   a first set of processor cores integrated on the single semiconductor die having the same functional operationality; and
   a second set of at least one processor core integrated on the single semiconductor die having a different functional operationality than a processor core of the first set of processor cores;
   a chain of multiple dedicated unidirectional connections spanning the first and second set of processor cores, at least one of the multiple dedicated unidirectional connections being between a one of the first set of processor cores and a one of the second set of processor cores, the multiple dedicated unidirectional connections terminating in registers within the respective processor cores;
   wherein the registers in a one of the second set of processor cores comprises multiple registers that a one of the first set of processor cores accesses as a circular ring queue;
   wherein the second set of processor cores includes at least one ring register; and
   wherein the ring register is undated when an operation is performed on the circular ring.

2. The processor of claim 1, wherein the multiple dedicated unidirectional connections comprise a connection from a one of the second set of processor cores to a one of the first set of processor cores.

3. The processor of claim 2, wherein the multiple dedicated unidirectional connections comprise a connection from a one of the first set of processor cores to the one of a second set of processor cores.

4. The processor of claim 1,
   wherein each processor core in the first set of processor cores comprises a processor core having the same instruction set; and
   wherein the second set of at least one processor cores comprises a set of at least one processor cores having a different instruction set than processor cores in the first set of processor cores.

5. The processor of claim 1,
   wherein each processor core in the first set of processor cores comprises a processor core having the same processor core component architecture; and
   wherein the second set of at least one processor cores comprises a set of at least one processor core having a different processor core component architecture than processor cores in the first set of processor cores.

6. The processor of claim 1, wherein each of the multiple processor cores of the first set of processor cores and the second set of at least one processor core comprises a processor core having a single dedicated unidirectional connection to a different one of the multiple processor cores.

7. The processor of claim 1, wherein the multiple cores of the first set of processor cores and the second set of at least one processor core comprise a processor core having multiple dedicated unidirectional connections to different ones of the multiple processor cores.

8. The processor of claim 1, wherein the dedicated unidirectional connections form an acyclic graph.

9. The processor of claim 1, wherein a one of the second set of processor cores comprises a processor core having an instruction set that includes at least one instruction that uses the at least one register as an instruction operand, the at least one instruction to be included in a program executed by the processor core.

10. The processor of claim 1, wherein the first set of processor cores comprise processor cores each having multiple hardware contexts for multiple, respective, threads of execution.

11. The processor of claim 1,
    wherein each processor core in the first set of processor cores comprises a processor core having the same instruction set; and
    wherein the second set of at least one processor cores comprises a set of at least one processor cores having a different instruction set than processor cores in the first set of processor cores;
    wherein the dedicated unidirectional connections form an acyclic graph;
    wherein the first set of processor cores comprise processor cores each having multiple hardware contexts for multiple, respective, threads of execution; and
    wherein data transfers between the cores is asynchronous with respect to other data transfers between the cores.

12. A network device, comprising:
    multiple blades;
    a switch fabric interconnecting the multiple blades;
    wherein at least one of the multiple blades comprises a blade having a processor having multiple cores integrated on a single semiconductor die, the multiple cores including:
    a first set of processor cores integrated on the single semiconductor die having the same functional operationality, the first set of processor cores each having multiple hardware contexts for multiple, respective, threads of execution; and a second set of at least one processor core integrated on the single semiconductor die having a different functional operationality than a processor core of the first set of processor cores;

a chain of multiple dedicated unidirectional connections spanning the first and second set of processor cores, at least one of the multiple dedicated unidirectional connections being between a one of the first set of processor cores and a one of the second set of processor cores, the multiple dedicated unidirectional connections terminating in registers within the respective processor cores;

wherein the registers in a one of the second set of processor cores comprises multiple registers that a one of the first set of processor cores accesses as a circular ring queue;

wherein the second set of processor cores includes at least one ring register; and wherein the ring register is updated when an operation is performed on the circular ring.

13. The network device of claim 12,
wherein each processor core in the first set of processor cores comprises a processor core having the same instruction set; and
wherein the second set of at least one processor cores comprises a set of at least one processor cores having a different instruction set than processor cores in the first set of processor cores.

14. The network device of claim 12, wherein the dedicated unidirectional connections form an acyclic graph.

15. The network device of claim 12, wherein a one of the second set of processor cores comprises a processor core having an instruction set that includes at least one instruction that uses the at least one register as an instruction operand.

16. A method, comprising:
at a processor having multiple cores integrated on a single semiconductor die, the multiple cores including:
a first set of processor cores integrated on the single semiconductor die having the same functional operationality; and
a second set of at least one processor core integrated on the single semiconductor die having a different functional operationality than a processor core of the first set of processor cores;
a chain of multiple dedicated unidirectional connections spanning the first and second set of processor cores, at least one of the multiple dedicated unidirectional connections being between a one of the first set of processor cores and a one of the second set of processor cores, the multiple dedicated unidirectional connections terminating in registers within the respective processor cores, wherein the registers terminating a unidirectional connection within a respective processor core form a queue; and
transferring a first set of data from a one of the first set of processor cores to a one of the second set of processor cores via a one of the multiple dedicated unidirectional connections.

17. The method of claim 16, further comprising:
transferring a second set of data from a one of the first set of processor cores to a one of the second set of processor cores via a one of the multiple dedicated unidirectional connections, the transferring a second set of data being asynchronous with respect to the transferring the first set of data;
wherein a time overlap occurs between the transferring the first set of data and the transferring the second set of data; and
wherein the one of the first set of processor cores transferring the second set of data is different than the one of the first set processor cores transferring the first set of data.

18. The processor of claim 1, wherein the dedicated unidirectional connections form a cyclic graph.

19. The processor of claim 1, wherein at least one core in the first set of processor cores and the second set of processor cores comprises a core having dedicated unidirectional connections terminating in registers of more than two other of the cores.

20. The processor of claim 1, wherein at least some of the cores in the first set of processor cores and the second set of at least one processor core are not coplanar and wherein at least some of the dedicated unidirectional connections connect ones of the processor cores that are not coplanar.

21. The method of claim 16, wherein the respective processors core generates a queue full signal for the queue of the respective processor core.

22. The method of claim 16, wherein the queue comprises a circular ring queue.

* * * * *